(12) United States Patent
Thomson et al.

(10) Patent No.: US 8,217,832 B2
(45) Date of Patent: Jul. 10, 2012

(54) ENHANCING LOCATION ACCURACY USING MULTIPLE SATELLITE MEASUREMENTS BASED ON ENVIRONMENT

(75) Inventors: Martin Wyville Thomson, Keiraville (AU); Neil Lindsay Harper, Mangerton (AU); Nguyen Khiem Tran, Sutherland (AU)

(73) Assignee: Andrew, LLC, Hickory, NC (US)

( * ) Notice: Subject to any disclaimer, the term of this patent is extended or adjusted under 35 U.S.C. 154(b) by 385 days.

(21) Appl. No.: 12/565,395

(22) Filed: Sep. 23, 2009

(65) Prior Publication Data

US 2011/0068977 A1    Mar. 24, 2011

(51) Int. Cl.
*G01S 19/06* (2010.01)
*G01S 19/20* (2010.01)
*G01S 19/31* (2010.01)
*G01S 19/33* (2010.01)

(52) U.S. Cl. ......... 342/357.43; 342/357.58; 342/357.71; 342/357.73

(58) Field of Classification Search ............. 342/357.15, 342/357.43, 357.73, 357.58, 357.71
See application file for complete search history.

(56) References Cited

U.S. PATENT DOCUMENTS

| | | | |
|---|---|---|---|
| 3,150,372 A | 9/1964 | Groth, Jr. | |
| 3,659,085 A | 4/1972 | Potter et al. | |
| 4,728,959 A | 3/1988 | Maloney | |
| 4,814,751 A | 3/1989 | Hawkins | |
| 4,845,504 A | 7/1989 | Roberts et al. | |
| 4,891,650 A | 1/1990 | Sheffer | |
| 5,056,106 A | 10/1991 | Wang | |
| 5,218,618 A | 6/1993 | Sagey | |
| 5,317,323 A | 5/1994 | Kennedy et al. | |
| 5,327,144 A | 7/1994 | Stilp et al. | |
| 5,365,544 A | 11/1994 | Schilling | |
| 5,372,144 A | 12/1994 | Mortier et al. | |
| 5,404,376 A | 4/1995 | Dent | |
| 5,423,067 A | 6/1995 | Manabe | |
| 5,465,289 A | 11/1995 | Kennedy | |

(Continued)

FOREIGN PATENT DOCUMENTS

JP    06-347529    12/1994

OTHER PUBLICATIONS

Amir Leshem, Mati Wax, "Array Calibration in the Presence of Multipath," IEEE Transactions on Signal Processing, vol. 48, No. 1, pp. 53-59, Jan. 2000.

(Continued)

*Primary Examiner* — Thomas Tarcza
*Assistant Examiner* — Frank J McGue
(74) *Attorney, Agent, or Firm* — Duane Morris, LLP

(57) ABSTRACT

A system and method for determining a location of a wireless device in a communications network. A request for satellite assistance data may be received from a requesting entity, and a reference location determined as a function of the request. One or more characterizing attributes may be identified as a function of the reference location, and a set of satellites determined as a function of the reference location. It may also be determined whether more than one set of signal measurements should be acquired from one or more satellites in the set of satellites as a function of the identified one or more characterizing attributes. The one or more sets of signal measurements may be acquired, and a location of the wireless device determined from the acquired measurements.

21 Claims, 4 Drawing Sheets

U.S. PATENT DOCUMENTS

| | | | |
|---|---|---|---|
| 5,506,863 A | 4/1996 | Meidan et al. | |
| 5,506,864 A | 4/1996 | Schilling | |
| 5,508,708 A | 4/1996 | Ghosh et al. | |
| 5,512,908 A | 4/1996 | Herrick | |
| 5,515,419 A | 5/1996 | Sheffer | |
| 5,519,760 A | 5/1996 | Borkowski et al. | |
| 5,559,864 A | 9/1996 | Kennedy | |
| 5,592,180 A | 1/1997 | Yokev et al. | |
| 5,608,410 A | 3/1997 | Stilp et al. | |
| 5,614,914 A | 3/1997 | Bolgiano et al. | |
| 5,675,344 A | 10/1997 | Tong et al. | |
| 5,736,964 A | 4/1998 | Ghosh et al. | |
| 5,815,538 A | 9/1998 | Grell et al. | |
| 5,825,887 A | 10/1998 | Lennen | |
| 5,870,029 A | 2/1999 | Otto et al. | |
| 5,920,278 A | 7/1999 | Tyler et al. | |
| 5,952,969 A | 9/1999 | Hagerman et al. | |
| 5,959,580 A | 9/1999 | Maloney et al. | |
| 5,960,341 A | 9/1999 | LeBlanc et al. | |
| 5,973,643 A | 10/1999 | Hawkes et al. | |
| 5,987,329 A | 11/1999 | Yost | |
| 6,014,102 A | 1/2000 | Mitzlaff et al. | |
| 6,047,192 A | 4/2000 | Maloney | |
| 6,091,362 A | 7/2000 | Stilp | |
| 6,097,336 A | 8/2000 | Stilp | |
| 6,097,959 A | 8/2000 | Yost | |
| 6,101,178 A | 8/2000 | Beal | |
| 6,108,555 A | 8/2000 | Maloney et al. | |
| 6,115,599 A | 9/2000 | Stilp | |
| 6,119,013 A | 9/2000 | Maloney et al. | |
| 6,127,975 A | 10/2000 | Maloney | |
| 6,144,711 A | 11/2000 | Raleigh et al. | |
| 6,172,644 B1 | 1/2001 | Stilp | |
| 6,184,829 B1 | 2/2001 | Stilp | |
| 6,188,351 B1 | 2/2001 | Bloebaum | |
| 6,191,738 B1 | 2/2001 | Pfeil et al. | |
| 6,201,499 B1 | 3/2001 | Hawkes et al. | |
| 6,201,803 B1 | 3/2001 | Munday et al. | |
| 6,212,319 B1 | 4/2001 | Cayrefourcq | |
| 6,233,459 B1 | 5/2001 | Sullivan et al. | |
| 6,246,884 B1 | 6/2001 | Karmi et al. | |
| 6,266,013 B1 | 7/2001 | Stilp et al. | |
| 6,281,834 B1 | 8/2001 | Stilp | |
| 6,285,321 B1 | 9/2001 | Stilp et al. | |
| 6,288,675 B1 | 9/2001 | Maloney | |
| 6,288,676 B1 | 9/2001 | Maloney | |
| 6,295,455 B1 | 9/2001 | Fischer et al. | |
| 6,311,043 B1 | 10/2001 | Haardt et al. | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,351,235 B1 | 2/2002 | Stilp | |
| 6,366,241 B2 | 4/2002 | Pack | |
| 6,388,618 B1 | 5/2002 | Stilp et al. | |
| 6,400,320 B1 | 6/2002 | Stilp et al. | |
| 6,407,703 B1 | 6/2002 | Minter et al. | |
| 6,459,405 B1* | 10/2002 | Da et al. | 342/357.67 |
| 6,463,290 B1 | 10/2002 | Stilp et al. | |
| 6,470,195 B1 | 10/2002 | Meyer | |
| 6,477,161 B1 | 11/2002 | Hudson | |
| 6,483,460 B2 | 11/2002 | Stilp et al. | |
| 6,492,944 B1 | 12/2002 | Stilp | |
| 6,501,955 B1 | 12/2002 | Durrant et al. | |
| 6,519,465 B2 | 2/2003 | Stilp et al. | |
| 6,546,256 B1 | 4/2003 | Maloney | |
| 6,553,322 B1 | 4/2003 | Ignagni | |
| 6,563,460 B2 | 5/2003 | Stilp et al. | |
| 6,571,082 B1 | 5/2003 | Rahman | |
| 6,603,428 B2 | 8/2003 | Stilp | |
| 6,603,761 B1 | 8/2003 | Wang | |
| 6,640,106 B2 | 10/2003 | Gutowski et al. | |
| 6,646,604 B2 | 11/2003 | Anderson | |
| 6,661,379 B2 | 12/2003 | Stilp et al. | |
| 6,720,915 B2* | 4/2004 | Sheynblat | 342/357.67 |
| 6,765,531 B2 | 7/2004 | Anderson | |
| 6,771,625 B1 | 8/2004 | Beal | |
| 6,771,969 B1 | 8/2004 | Chinoy | |
| 6,782,264 B2 | 8/2004 | Anderson | |
| 6,834,234 B2 | 12/2004 | Scherzinger et al. | |
| 6,839,539 B2 | 1/2005 | Durrant et al. | |
| 6,845,240 B2 | 1/2005 | Carlson et al. | |
| 6,859,172 B2 | 2/2005 | Powers et al. | |
| 6,871,077 B2 | 3/2005 | Kennedy, Jr. | |
| 6,873,290 B2 | 3/2005 | Anderson et al. | |
| 6,876,859 B2 | 4/2005 | Anderson et al. | |
| 6,920,329 B2 | 7/2005 | Kennedy, Jr. et al. | |
| 6,922,170 B2 | 7/2005 | Alexander, Jr. | |
| 6,952,158 B2 | 10/2005 | Kennedy, Jr. | |
| 6,987,979 B2 | 1/2006 | Carlsson | |
| 6,996,392 B2 | 2/2006 | Anderson | |
| 7,023,383 B2 | 4/2006 | Stilp et al. | |
| 7,167,713 B2 | 1/2007 | Anderson | |
| 7,271,765 B2 | 9/2007 | Stilp et al. | |
| 7,340,259 B2 | 3/2008 | Maloney | |
| 7,427,952 B2 | 9/2008 | Bull et al. | |
| 7,440,762 B2 | 10/2008 | Maloney et al. | |
| 7,593,738 B2 | 9/2009 | Anderson | |
| 7,893,869 B2* | 2/2011 | Gaal et al. | 342/357.21 |
| 2002/0172223 A1 | 11/2002 | Stilp et al. | |
| 2003/0064734 A1 | 4/2003 | Stilp et al. | |
| 2003/0139188 A1 | 7/2003 | Chen et al. | |
| 2003/0190919 A1 | 10/2003 | Niemenmaa | |
| 2003/0203738 A1 | 10/2003 | Brown et al. | |
| 2004/0043775 A1 | 3/2004 | Kennedy, Jr. et al. | |
| 2004/0132466 A1 | 7/2004 | Kennedy, Jr. et al. | |
| 2004/0203921 A1 | 10/2004 | Bromhead et al. | |
| 2004/0218664 A1 | 11/2004 | Kennedy, Jr. et al. | |
| 2004/0252752 A1 | 12/2004 | Kennedy, Jr. et al. | |
| 2005/0058182 A1 | 3/2005 | Kennedy, Jr. et al. | |
| 2005/0136945 A1 | 6/2005 | Kennedy, Jr. et al. | |
| 2005/0164712 A1 | 7/2005 | Kennedy, Jr. et al. | |
| 2005/0192026 A1 | 9/2005 | Carlson et al. | |
| 2006/0003695 A1 | 1/2006 | Kennedy, Jr. et al. | |
| 2006/0003775 A1 | 1/2006 | Bull et al. | |
| 2006/0030333 A1 | 2/2006 | Ward et al. | |
| 2006/0116130 A1 | 6/2006 | Kennedy, Jr. et al. | |
| 2006/0125695 A1 | 6/2006 | Kennedy, Jr. et al. | |
| 2006/0141998 A1 | 6/2006 | Kennedy, Jr. et al. | |
| 2006/0154607 A1 | 7/2006 | Kenney, Jr. et al. | |
| 2006/0240836 A1 | 10/2006 | Kennedy, Jr. et al. | |
| 2006/0293066 A1* | 12/2006 | Edge et al. | 455/456.3 |
| 2007/0087689 A1 | 4/2007 | Kennedy, Jr. et al. | |
| 2007/0111746 A1 | 5/2007 | Anderson et al. | |
| 2007/0155401 A1 | 7/2007 | Ward et al. | |
| 2007/0155489 A1 | 7/2007 | Beckley et al. | |
| 2007/0202885 A1 | 8/2007 | Kennedy, Jr. et al. | |
| 2008/0132244 A1 | 6/2008 | Anderson et al. | |
| 2008/0132247 A1 | 6/2008 | Anderson et al. | |
| 2008/0137524 A1 | 6/2008 | Anderson et al. | |
| 2008/0158059 A1 | 7/2008 | Bull et al. | |
| 2008/0160952 A1 | 7/2008 | Bull et al. | |
| 2008/0160953 A1 | 7/2008 | Mia et al. | |
| 2008/0161015 A1 | 7/2008 | Maloney et al. | |
| 2008/0248811 A1 | 10/2008 | Maloney et al. | |
| 2008/0261611 A1 | 10/2008 | Mia et al. | |
| 2008/0261612 A1 | 10/2008 | Mia et al. | |
| 2008/0261613 A1 | 10/2008 | Anderson et al. | |
| 2008/0261614 A1 | 10/2008 | Mia et al. | |
| 2009/0005061 A1 | 1/2009 | Ward et al. | |

OTHER PUBLICATIONS

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergendy Locating in GSM", Process IEEE International Conference, Personal Wireless Communications, vol. 1, 1996, pp. 232-238.

Y. Zhao, "Standardization of Mobile Phone Positioning for 3G Systems," IEEE Communications Magazine, Jul. 2002, pp. 108-116.

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.In/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

* cited by examiner

ENHANCING LOCATION ACCURACY USING MULTIPLE SATELLITE MEASUREMENTS BASED ON ENVIRONMENT

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, in 2001 the United States Federal Communications Commission ("FCC") required that cellular handsets must be geographically locatable. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are conventionally utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 in and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time. There is also an L2C signal being transmitted by several satellites. The L2C signal is a second civilian frequency transmitted by GPS satellites. L1 transmits the Coarse Acquisition ("C/A") code. L2C transmits L2CM (civil-moderate) and L2CL (civil long) codes. These codes allow a device to differentiate between satellites that are all transmitting on the same frequency. The C/A code is 1 milliseconds long, the L2CM is 20 milliseconds long and the L2CL is 1.5 seconds long. The L2C codes provide a more robust cross-correlation performance so that reception of weak GPS signals is less affected by simultaneously received strong GPS signals. The civil navigation message ("CNAV") is the broadcast model that can be transmitted on the L2C and provides a more accurate and frequent message than the legacy navigation message ("NAV").

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors, and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems generally account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time, is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Traditionally, satellite coordinates and velocity have been computed inside the GPS receiver. The receiver obtains satellite ephemeris and clock correction data by demodulating the satellite broadcast message stream. The satellite transmission contains more than 400 bits of data transmitted at 50 bits per second. The constants contained in the ephemeris data coincide with Kepler orbit constants requiring many mathematical operations to turn the data into position and velocity data for each satellite. In one implementation, this conversion requires 90 multiplies, 58 adds and 21 transcendental function cells (sin, cos, tan) in order to translate the ephemeris into a satellite position and velocity vector at a single point, for one satellite. Most of the computations require double precision, floating point processing.

Thus, the computational load for performing the traditional calculation is significant. The mobile device must include a high-level processor capable of the necessary calculations, and such processors are relatively expensive and consume large amounts of power. Portable devices for consumer use, e.g., a cellular phone or comparable device, are preferably inexpensive and operate at very low power. These design goals are inconsistent with the high computational load required for GPS processing. Further, the slow data rate from the UPS satellites is a limitation. GPS acquisition at a GPS receiver may take many seconds or several minutes, during which time the receiver circuit and processor of the mobile device must be continuously energized. Preferably, to maintain battery life in portable receivers and transceivers such as mobile cellular handsets, circuits are de-energized as much as possible. The long GPS acquisition time can rapidly deplete the battery of a mobile device. In any situation and particularly in emergency situations, the long GPS acquisition time is inconvenient.

Assisted-GPS ("A-GPS") has gained significant popularity recently in light of stringent time to first fix ("TTFF"), i.e., first position determination and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network or a wide area reference network ("WARN")) including receivers with clear views of the sky that may operate continuously. This reference network may also be connected with the cellular infrastructure, may continuously monitor the real-time constellation status, and may provide data for each satellite at a particular epoch time. For example, the reference network may provide ephemeris information, UTC model information, ionosphere model information, and other broadcast information to the cellular infrastructure. As one skilled in the art would recognize, the GPS reference receiver and its server (or position determining entity) may be located at any surveyed location with an open view of the sky. Typical A-GPS information may include data for determining a GPS receiver's approximate position, time synchronization mark, satellite ephemerides, various model information and satellite dopplers. Different A-GPS services may omit some of these parameters; however, another component of the supplied information is the identification of the satellites for which a device or GPS receiver should search. From such assistance data, a mobile device will attempt to search for and acquire satellite signals for the satellites included in the assistance data. If, however, satellites are included in the assistance data that are not measurable by the mobile device (e.g., the satellite is no longer visible, the satellite is totally or partially occluded, multipath, etc.), then the mobile device will waste time and considerable power attempting to acquire measurements for the satellite.

A-GPS handset implementations generally rely upon provided assistance data to indicate which satellites are visible or "in view." As a function of the assistance data, a mobile device will attempt to search for and acquire satellite signals for the satellites included in the assistance data. A-GPS positioning may also rely upon the availability of a coarse location estimate to seed the positioning method. This coarse location estimate or reference location may be utilized to determine a likely set of satellites from which a respective mobile device may receive signals. For example, upon receipt of a location request, satellites in view of the reference location for a wireless device may be determined so that a location determining entity, e.g., location information server ("LIS") or mobile location center ("MLC") can provide assistance data for those respective satellites. Once the satellites in view are determined, assistance data for those satellites may be collated (or calculated), encoded into the relevant protocol, and provided to the handset.

Typical GNSS or GPS receivers suffer from poor accuracy and yield in a wide range of environments. For example, indoor locations and densely constructed landscapes such as urban canyons introduce obstacles that negatively affect the ability of a GNSS or GPS receiver to measure satellite signals. Degradation in the accuracy of location solutions may also arise because a limited portion of space is obstructed by the environment surrounding the receiver. Buildings are of a particular concern as these may partially or totally occlude satellites, attenuate signals from satellites, or produce severe multipath. As a result, satellite measurement data may be limited in both a selection of satellites and in the quality of measurement results from satellites measured by the respective GNSS receiver.

A-GNSS or A-GPS systems are adaptable to utilize information about the environment to instruct GNSS receivers regarding how to measure the satellites to improve accuracy, yield, and TTFF. There is, however, a need for a method and system for enhancing location accuracy using multiple satellite measurements. Embodiments of the present subject matter may instruct a GNSS receiver to acquire multiple consecutive measurements of satellites over time to reduce any errors introduced by satellite measurements. These repeated measurements may aid in compensating for high measurement error, poor satellite geometry (high DOP), high multipath and local occlusion. Whether multiple measurements are required and how many measurements are necessary may be useful to determine ahead of time. Thus, embodiments of the present subject matter may instruct a GNSS receiver to take multiple measurements while maintaining a continuous monitor of satellite signals to thereby reduce the time to take subsequent measurements and decrease power consumption by the receiver.

Thus, one embodiment of the present subject matter provides a method for determining a location of a wireless device in a communications network. The method may include the steps of receiving a request for satellite assistance data from a requesting entity, determining a reference location as a function of the request, and identifying one or more characterizing attributes as a function of the reference location. A set of satellites may be determined as a function of the reference location. It may also be determined whether more than one set of signal measurements should be acquired from one or more satellites in the set of satellites as a function of the identified one or more characterizing attributes. The one or more sets of signal measurements may then be acquired, and a location of the wireless device determined from the acquired measurements.

Another embodiment of the present subject matter provides a method for determining a location of a wireless device in a communications network. The method may include the steps of receiving a request for satellite assistance data from a requesting entity, determining a reference location as a function of the request, and predicting one or more characterizing attributes as a function of the reference location. A set of satellites may be determined as a function of the reference location. It may also be determined whether more than one set of signal measurements should be acquired from one or more satellites in the set of satellites as a function of the predicted attributes. The one or more sets of signal measurements may then be acquired, and a location of the wireless device determined from the acquired measurements.

In a further embodiment of the present subject matter a method for determining a location of a wireless device in a communications network having a plurality of nodes is provided. The method may comprise identifying one or more characterizing attributes for ones of the plural nodes and determining a threshold number of signal measurements to be received from a set of satellites as a function of the identified characterizing attributes, the set of satellites being in view of the ones of the plural nodes. A second number of signal measurements may be received from the set of satellites and if the second number does not meet or exceed the threshold number, the received signal measurements may be stored in a database until the threshold number of signal measurements have been received.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
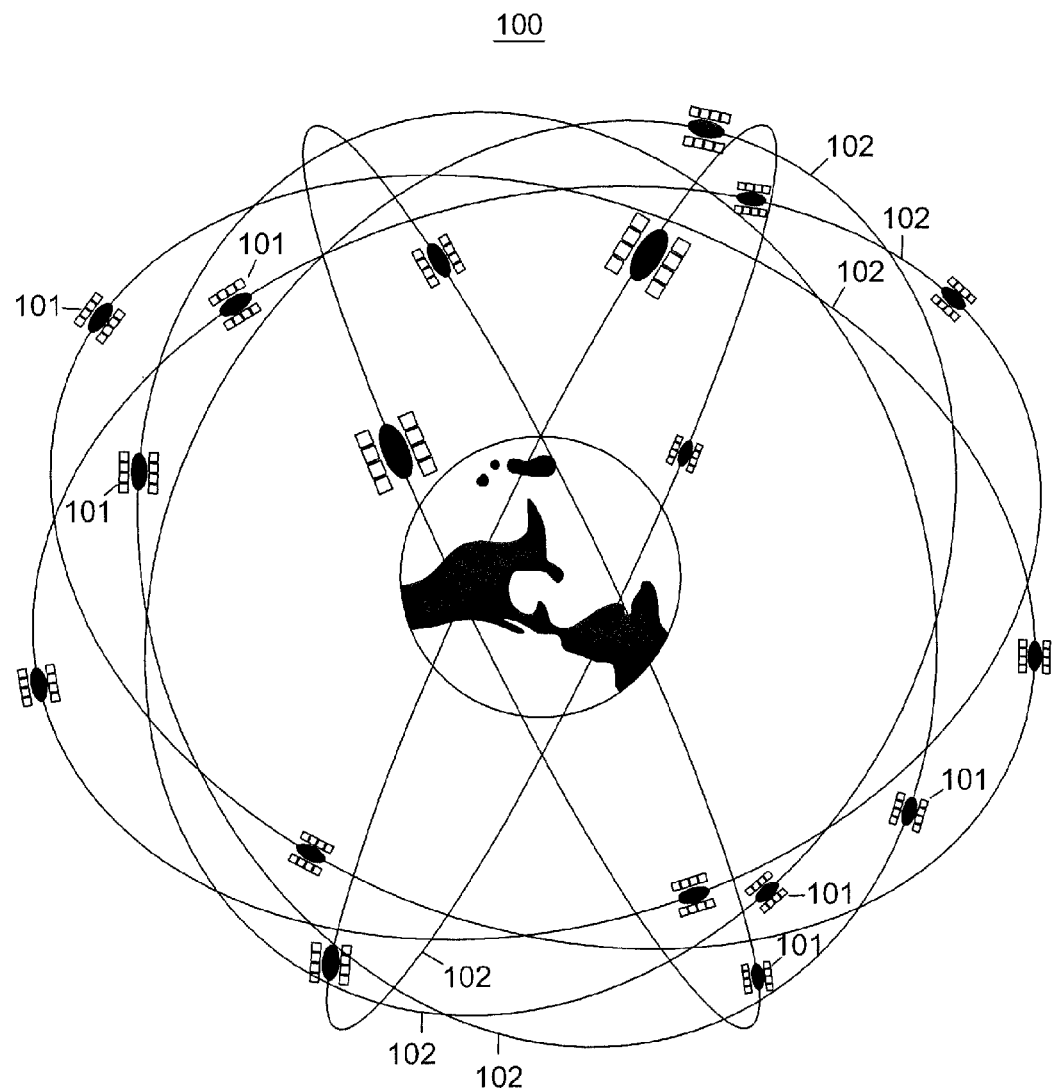
FIG. 1 is a schematic representation of a constellation of GPS satellites.

With reference to the figures where like elements have been given like numerical designations to facilitate an understanding of the present subject matter, the various embodiments of a method and system for enhancing location accuracy using multiple satellite measurements based on environment are herein described.

The disclosure relates to a mobile appliance or device and a location determining system using satellite signals and/or measurements of these satellite signals. Exemplary devices may include, but are not limited to, a cellular device, text messaging device, computer, portable computer, vehicle locating device, vehicle security device, communication device, and wireless transceiver. The satellites may be considered as part of a Global Navigation Satellite System ("GNSS"), such as, but not limited to, the U.S. Global Positioning System ("GPS"). While the following description references a GNSS or GPS system, this in no way should be interpreted as limiting the scope of the claims appended herewith. As is known to those of skill in the art, other satellite systems operate, for the purposes of this disclosure, similarly to GPS, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above and should not limit the scope of the claims appended herewith.

Generally wireless A-GPS devices or handsets have a low time to first fix ("TTFF") as the devices are supplied with assistance data from an exemplary communications network to assist in locking onto or acquiring satellites quickly. Exemplary A-GPS devices may include, but are not limited to, a cellular device, text messaging device, computer, portable computer, vehicle locating device, vehicle security device, communication device, and wireless transceiver. These devices may provide satellite measurements back to a location determining system to perform a position calculation. Exemplary network elements that supply the assistance data and/or perform the position calculation may be a location determining system such as a Mobile Location Center ("MLC"), location information server or system ("LIS"), or other comparable network element. The location determining system may generally be a node in a wireless network that performs the location of a mobile device.

Typical A-GPS information includes data for determining a GPS receiver's approximate position, time synchronization mark, satellite ephemerides, and satellite dopplers. Different A-GPS services may omit some of these parameters; however, another component of the supplied information may be the identification of the satellites for which a device or GPS receiver should search. Acquisition assistance data for A-GPS is generally comprised of several fields (GPS time of week, satellite ID, Doppler, Code Phase, satellite elevation, azimuth, etc.) having a consistent content (but not encoding format) across the various Positioning Calculation Application Part ("PCAP"), Radio Resource LCS Protocol ("RRLP") and Position Determination for Dual Mode ("PDDM") specifications. Generally, a message sequence starts with a request for assistance data arriving in an MLC with an estimated handset location. This may include the horizontal uncertainty, the altitude and the altitude uncertainty. In some instances, the estimated handset location may be the location of a serving cell tower. The MLC may then calculate the assistance data and return it to the handset. Thus, once the satellites in view are determined, assistance data for the satellites may be collated, encoded into the relevant protocol, and provided to the respective wireless device. The handset may then use the assistance data to lock onto the respective satellite(s) and report the measurements to the server. Of course, embodiments of the present subject matter may determine the reference location of the wireless device in any number of ways and such a disclosure should not limit the scope of the claims appended herewith. Further, the reference location may be determined as a function of signals received from a terrestrial radio frequency ("RF") technology such as, but not limited to, a cellular technology or a different type of network such as WiFi or WiMax.

Using the determined reference location, the MLC may then determine a set of satellites in view at a particular time. This may be accomplished by determining the location and/or velocity of each of the satellites in view at that particular time, determining the elevation for each satellite from the reference location, selecting a set of satellites in view as those satellites having an elevation greater than a predetermined mask angle, and/or piecing together acquisition assistance data if necessary. An exemplary method of determining the location for each satellite is described in the GPS Interface Control Document ("ICD"), the entirety of which is incorporated herein by reference. Generally, this procedure utilizes a satellite's ephemeris parameters and places these parameters into a series of equations. A portion of this procedure to determine a satellite's location solves Kepler's non-linear equation. The general method of solving Kepler's equation utilizes an iterative solution; however, the comparatively large number of steps results in a relatively expensive and time-consuming operation.

When assistance data is required for the determination of the location of a wireless device, a server should determine which satellites are in view to provide appropriate assistance data as described above. For a high throughput system such as an MLC (e.g., 200 TPS) these calculations may be performed regularly. Further, knowledge of characterizing attributes of an environment surrounding a receiver or wireless device may provide the server with information that the server may utilize in instructing the receiver to take multiple measurements. If the server is provided with information about the nature of the environment, a simple set of rules may be employed to trigger multiple measurements. For example, multiple measurements may be taken for urban and other densely constructed environments. Exemplary attributes may be a function of any one or combination of multipath characteristics, local occlusion characteristics, satellite geometry, base station density, and historical call data.

In an exemplary wireless network, an A-GNSS server may maintain environmental information for individual base stations, sectors, cells, regions or any other partitioning of the network. As base station coverage areas are often used as an input to GNSS location systems for the purposes of assistance data determination and delivery, this information may be readily obtained or may be known. Identifying the nature of the environment surrounding a particular base station may thus allow an A-GNSS server to make a determination of how many satellite measurements to request.

In another embodiment, a receiver may be provided with an interval at which to take the multiple measurements. This interval may be predicted as a function of any one or combination of characterizing attributes of the network. TTFF is generally useful when determining a location of a wireless receiver in an A-GNSS system, and many of deleterious effects (e.g., measurement error, multipath, etc.) may be mitigated from a short interval between consecutive satellite measurements. One exemplary interval may be approximately 500 milliseconds or greater. Of course, this example should not limit the scope of the claims appended herewith as there may be environments where a larger or smaller interval between each set of measurements could be useful provided there is not a narrow time required to make a location fix, and a more accurate fix is preferred. For example, in a network having areas of local occlusion, e.g., near a street with heavy traffic and possibly large vehicles that often block satellite signals, it may be beneficial to have a period of several seconds to allow for changes in the traffic pattern. This information may be stored with the base stations or other components in the system for later use.

In embodiments of the present subject matter where environmental information is not readily available, an exemplary A-GNSS server may employ a set of heuristics to predict a likely environment. Based on, in part, a knowledge of the distribution of base stations, e.g., where base station density exceeds a predetermined threshold, the system may determine that multiple measurements are required. Of course, the attribute of base station density is exemplary only and should not limit the scope of the claims appended herewith. This prediction may also, in one embodiment, be augmented with information provided by a GNSS receiver. Further, if the GNSS receiver provides measurement information regarding radio transmitters in the region, the density of the environment may also be inferred by the number of measured transmitters.

Alternatively, an exemplary A-GNSS server may maintain a history of location requests and the respective location results. Such a history may, for example, be specific to the cell to which the receiver is connected or to a geographic area having a predetermined resolution or a varying resolution. Employing details of how many measurements were necessary to achieve a predetermined accuracy target and/or a yield target, an exemplary A-GNSS server may then request that a GNSS receiver in the target area (or connected to the target cell) provide a specific number of additional GNSS measurements. Of course, a statistical analysis may refine this value over time and the process may be continuous or may selectively operate upon recorded data.

In the event that an A-GNSS server may not be able to request multiple measurements, multiple individual requests may be made and processing load on the server reduced where it is known that multiple measurements are likely to be required. Thus, rather than processing each individual set of measurements, processing may be deferred until additional measurement data is made available. In certain embodiments, an A-GNSS server may perform each location calculation in isolation; however, when more than one set of satellite measurements are available, embodiments of the present subject matter may perform additional processing to refine the final location calculation. One non-limiting refining method may be to select a location having the smallest calculated uncertainty area. In an embodiment having plural locations with a small uncertainty, an average location or other common metric may be employed to determine the best possible location. Alternatively, a method such as Kalman filtering may also be applied to each measurement to provide an improved location estimate.

Figure 2:
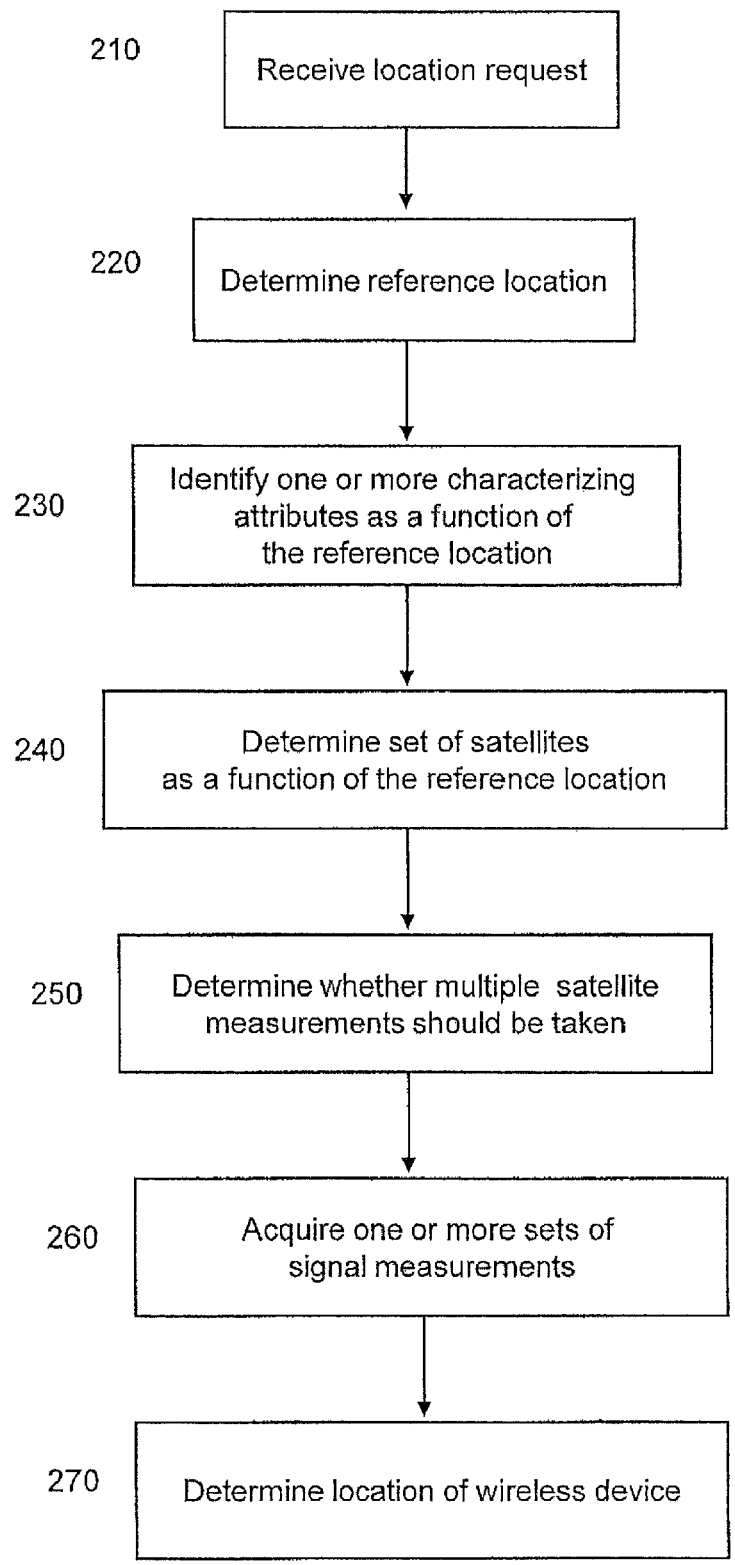
FIG. 2 is an algorithm according to one embodiment of the present subject matter.

FIG. 2 is an algorithm according to one embodiment of the present subject matter. With reference to FIG. 2, a method 200 is provided for determining a location of a wireless device in a communications network. At step 210, a request for satellite assistance data may be received from a requesting entity, and at step 220 a reference location determined as a function of the request. One or more characterizing attributes may be identified at step 230 as a function of the reference location, and at step 240 a set of satellites determined as a function of the reference location. These satellites may be a part of a GNSS system such as, but not limited to a GPS, Galileo system, GLONASS system, QZSS, Beidou satellite system, Compass satellite system, and combinations thereof. Further, these characterizing attributes may be a function of any one or combination of multipath characteristics, local occlusion characteristics, satellite geometry, base station density, and historical call data. Step 230 may, in one embodiment, include identifying one or more characterizing attributes stored in a database.

It may then be determined at step 250 whether more than one set of signal measurements should be acquired from one or more satellites in the set of satellites as a function of the identified characterizing attributes. The one or more sets of signal measurements may then be acquired as appropriate at step 260, and a location of the wireless device determined from the acquired measurements at step 270. The determined location may, in one embodiment, be refined as a function of any one or combination of uncertainty area, determined location metrics, and Kalman filtering. In one embodiment, if more than one set of signal measurements are acquired, an interval may be predicted at which to acquire the sets of signal measurements as a function of the one or more characterizing attributes. This interval may be, but is not limited to, 500 ms or more depending upon the environment. In another embodiment, assistance data may be transmitted to the wireless device, the assistance data including information for the set of satellites.

Figure 3:
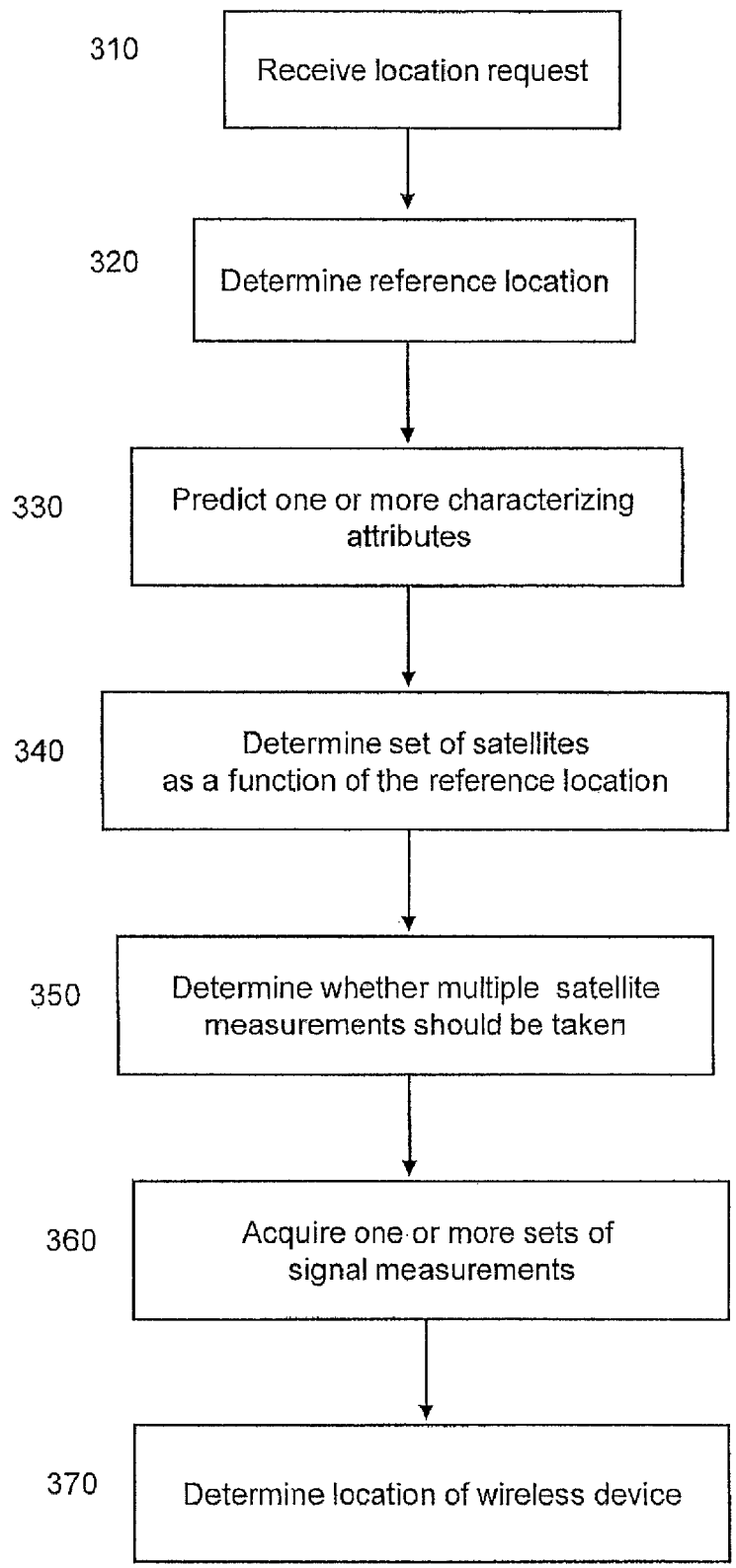
FIG. 3 is an algorithm according to another embodiment of the present subject matter.

FIG. 3 is an algorithm according to another embodiment of the present subject matter. With reference to FIG. 3, a method 300 is provided for determining a location of a wireless device in a communications network. At step 310, a request for satellite assistance data may be received from a requesting entity, and at step 320 a reference location determined as a function of the request. One or more characterizing attributes may be predicted at step 330 as a function of the reference location, and at step 340 a set of satellites determined as a function of the reference location. These satellites may be a part of a GNSS system such as, but not limited to a GPS, Galileo system, GLONASS system, QZSS, Beidou satellite system, Compass satellite system, and combinations thereof. Further, these predicted characterizing attributes may be a function of any one or combination of multipath characteristics, local occlusion characteristics, satellite geometry, base station density, and historical call data. Step 330 may, in one embodiment, further include utilizing a set of heuristics to predict the attributes. In yet another embodiment, step 330 may include augmenting the predicted attributes with information provided from the wireless device. An additional embodiment may, in step 330, predict one or more characterizing attributes for the reference location as a function of historical location request information or historical location request result information stored in a database.

At step 350, it may be determined whether more than one set of signal measurements should be acquired from one or more satellites in the set of satellites as a function of the predicted attributes. In one embodiment, step 330 may further comprise storing predicted characterizing attributes in a database, whereby step 350 would be determined as a function of the stored attributes. The one or more sets of signal measurements may then be acquired as appropriate at step 360, and a location of the wireless device determined from the acquired measurements at step 370. The determined location may, in one embodiment, be refined as a function of any one or combination of uncertainty area, determined location metrics, and Kalman filtering.

Figure 4:
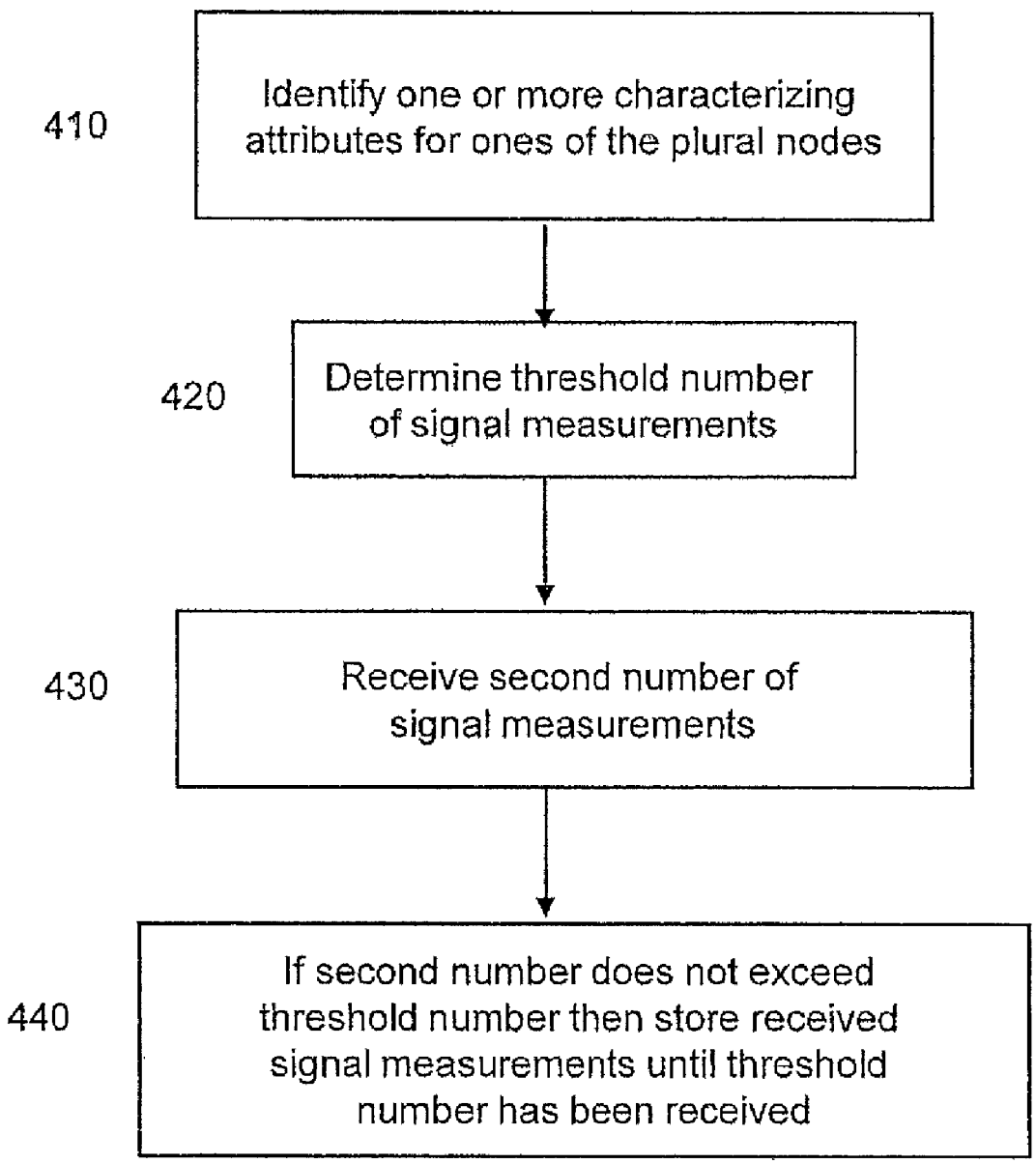
FIG. 4 is an algorithm according to a further embodiment of the present subject matter.

FIG. 4 is an algorithm according to a further embodiment of the present subject matter. With reference to FIG. 4, a method 400 is provided for determining a location of a wireless device in a communications network having a plurality of nodes. The method may include at step 410 identifying one or more characterizing attributes for ones of the plural nodes, and then at step 420 determining a threshold number of signal measurements to be received from a set of satellites as a function of the identified characterizing attributes, the set of satellites being in view of the ones of the plural nodes. At step 430, a second number of signal measurements may be received from the set of satellites. In another embodiment, step 430 may include receiving a second number of signal measurements from a second set of satellites.

If the second number does not meet or exceed the threshold number, then at step 440 the received signal measurements may be stored in a database until the threshold number of signal measurements have been received. In one embodiment, the method may include determining a location of the wireless device from the stored signal measurements. In yet an additional embodiment wherein consecutive signal measurements from the same or different sets of satellites are received, these measurements may be received at an interval determined as a function of the identified characterizing attributes.

FIGS. 2-4 illustrate high-level logic flow diagrams for exemplary process steps for implementing the method and system of the present subject matter. These steps are those requiring a physical manipulation of physical quantities. Usually, although not necessarily, these quantities take the form of electrical or magnetic signals capable of being stored, transmitted, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "receiving," "identifying," "acquiring," "determining," "storing," and the like, may commonly be associated with mental or physical operations performed by a human operator; however, no such capability of a human operator is possible or desirable in most cases of the operations described herein. As indicated herein, these operations are primarily machine operations. Useful machines for performing operations of a preferred embodiment of the present subject matter include data-processing systems. The present subject matter relating to method steps for processing electrical or other physical signals to generate other desired signals can generally be implemented via a computer or microcomputer.

It can be appreciated by those skilled in the art that the methods described herein can be implemented as a program product (e.g., a control program residing in a computer memory) containing instructions that when executed on a processor, carry out or direct several or all of the operations depicted in the logic diagrams of FIGS. 2-4. While the present subject matter is described in the context of a fully functional system, those skilled in the art will further appreciate that the present subject matter is capable of being distributed as a program product in a variety of forms, and that the present subject matter applies equally, regardless of the particular type of signal-bearing media utilized to actually carry out the distribution. Examples of signal-bearing media include recordable-type media, such as floppy disks, hard-disk drives and CD ROMs, and transmission-type media, such as digital and analog communication links As shown by the various configurations and embodiments illustrated in FIGS. 1-4, a method and system for enhancing location accuracy using multiple satellite measurements based on environment have been described.

The embodiments and examples set forth herein are presented to best explain the present subject matter and its practical application and to thereby enable those skilled in the art to make and utilize the present subject matter. However, those skilled in the art will recognize that the foregoing description and examples have been presented for the purpose of illustration and example only. Thus, while preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for determining a location of a wireless device in a communications network, the method comprising the steps of:
   (a) receiving a request for satellite assistance data from a requesting entity;

(b) determining a reference location as a function of the request;
(c) identifying one or more characterizing attributes as a function of an environment of the reference location;
(d) determining a set of satellites as a function of the reference location;
(e) determining whether more than one set of signal measurements should be acquired from one or more satellites in the set of satellites as a function of the identified one or more characterizing attributes;
(f) acquiring the one or more sets of signal measurements; and
(g) determining a location of the wireless device from the acquired measurements.

2. The method of claim 1 further comprising the step of:
if more than one set of signal measurements are acquired, predicting an interval at which to acquire the sets of signal measurements as a function of the one or more characterizing attributes.

3. The method of claim 2 wherein the interval is approximately 500 milliseconds.

4. The method of claim 2 wherein the interval is greater than 500 milliseconds.

5. The method of claim 1 further comprising the step of:
(i) transmitting assistance data to the wireless device, the assistance data including information for the set of satellites.

6. The method of claim 1 further comprising the step of refining the determined location as a function of any one or combination of uncertainty area, determined location metrics, and Kalman filtering.

7. The method of claim 1 wherein the satellites are part of a Global Navigation Satellite System ("GNSS") selected from the group consisting of: a Global Positioning System ("GPS"), Galileo system, GLONASS system, Quasi-Zenith Satellite System ("QZSS"), Beidou satellite system, Compass satellite system, and combinations thereof.

8. The method of claim 1 wherein the attributes are a function of any one or combination of multipath characteristics, local occlusion characteristics, satellite geometry, base station density, and historical call data.

9. The method of claim 1 wherein the step of identifying further comprises identifying one or more characterizing attributes stored in a database.

10. A method for determining a location of a wireless device in a communications network comprising the steps of:
(a) receiving a request for satellite assistance data from a requesting entity;
(b) determining a reference location as a function of the request;
(c) predicting one or more characterizing attributes as a function of an environment of the reference location;
(d) determining a set of satellites as a function of the reference location;
(e) determining whether more than one set of signal measurements should be acquired from one or more satellites in the set of satellites as a function of the predicted attributes;
(f) acquiring the one or more sets of signal measurements; and
(g) determining a location of the wireless device from the acquired measurements.

11. The method of claim 10 wherein the attributes are a function of any one or combination of multipath characteristics, local occlusion characteristics, satellite geometry, base station density, and historical call data.

12. The method of claim 10 wherein the step of predicting further comprises storing predicted characterizing attributes in a database, wherein the step of determining whether more than one set of signal measurements should be acquired as a function of the stored attributes.

13. The method of claim 10 wherein the step of predicting further comprises using a set of heuristics to predict the attributes.

14. The method of claim 10 wherein the step of predicting includes augmenting the predicted attributes with information provided from the wireless device.

15. The method of claim 10 wherein the step of predicting further comprises:
(i) predicting one or more characterizing attributes for the reference location as a function of historical location request information or historical location request result information stored in a database.

16. The method of claim 10 further comprising the step of refining the determined location as a function of any one or combination of uncertainty area, determined location metrics, and Kalman filtering.

17. The method of claim 10 wherein the satellites are part of a Global Navigation Satellite System ("GNSS") selected from the group consisting of: a Global Positioning System ("GPS"), Galileo system, GLONASS system, Quasi-Zenith Satellite System ("QZSS"), Beidou satellite system, Compass satellite system, and combinations thereof.

18. A method for determining a location of a wireless device in a communications network having a plurality of nodes, the method comprising the steps of:
(a) identifying one or more environmental characterizing attributes for ones of the plural nodes;
(b) determining a threshold number of signal measurements to be received from a set of satellites as a function of the identified characterizing attributes, the set of satellites being in view of the ones of the plural nodes; and
(c) receiving a second number of signal measurements from the set of satellites; and
(d) if the second number does not meet or exceed the threshold number, storing the received signal measurements in a database until the threshold number of signal measurements have been received.

19. The method of claim 18 further comprising the step of determining a location of the wireless device from the stored signal measurements.

20. The method of claim 18 wherein the step of receiving a second number further comprises receiving a second number of signal measurements from a second set of satellites.

21. The method of claim 18 wherein consecutive signal measurements from the same or different sets of satellites are received at an interval determined as a function of the identified characterizing attributes.

* * * * *